US012406782B2

(12) United States Patent
Liu et al.

(10) Patent No.: US 12,406,782 B2
(45) Date of Patent: Sep. 2, 2025

(54) OVER-CURRENT PROTECTION DEVICE

(71) Applicant: Polytronics Technology Corp., Hsinchu (TW)

(72) Inventors: Chen-Nan Liu, Pitou Township (TW); Yung-Hsien Chang, Douliu (TW); Hsiu-Che Yen, Taoyuan (TW); Cheng-Yu Tung, Tainan (TW); Chia-Yuan Lee, Hsinchu (TW); Yu-Chieh Fu, Hsinchu (TW); Yao-Te Chang, Linnei Township (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 381 days.

(21) Appl. No.: 18/150,729

(22) Filed: Jan. 5, 2023

(65) Prior Publication Data

US 2023/0395287 A1 Dec. 7, 2023

(30) Foreign Application Priority Data

Jun. 7, 2022 (TW) ................................. 111121004

(51) Int. Cl.
*H01C 7/02* (2006.01)
*H01C 1/14* (2006.01)

(52) U.S. Cl.
CPC ........... *H01C 7/021* (2013.01); *H01C 1/1406* (2013.01)

(58) Field of Classification Search
CPC .............................. H01C 7/021; H01C 1/1406
See application file for complete search history.

(56) References Cited

U.S. PATENT DOCUMENTS

| | | | | |
|---|---|---|---|---|
| 5,106,538 A * | 4/1992 | Barma | ..................... | H01B 1/22 252/511 |
| 5,106,540 A * | 4/1992 | Barma | ................... | H01C 7/027 252/511 |
| 6,143,206 A * | 11/2000 | Handa | .................... | H01C 7/027 252/511 |
| 9,997,906 B1 * | 6/2018 | Yen | .................. | H01C 17/06586 |

(Continued)

FOREIGN PATENT DOCUMENTS

| | | |
|---|---|---|
| CN | 101516980 A | 8/2009 |
| CN | 102924776 A | 2/2013 |

(Continued)

OTHER PUBLICATIONS

JP2007005547 translation (Year: 2007).*

*Primary Examiner* — Kyung S Lee
(74) *Attorney, Agent, or Firm* — MUNCY, GEISSLER, OLDS & LOWE, P.C.

(57) ABSTRACT

An over-current protection device comprises first and second electrode layers and a PTC material layer laminated therebetween. The PTC material layer includes a polymer matrix, a conductive filler and a titanium-containing inner filler. The polymer matrix has a fluorine-free polyolefin-based polymer. The titanium-containing inner filler has a compound represented by a general formula of $MTiO_3$, wherein the M represents transition metal or alkaline earth metal. The total volume of the PTC material layer is calculated as 100%, and the titanium-containing inner filler accounts for 1-9% by volume of the PTC material layer.

14 Claims, 1 Drawing Sheet

(56) References Cited

U.S. PATENT DOCUMENTS

| | | | | |
|---|---|---|---|---|
| 2008/0009572 | A1* | 1/2008 | Khatua | C09C 1/36<br>524/160 |
| 2019/0096621 | A1* | 3/2019 | Chen | H01H 85/06 |
| 2020/0328015 | A1* | 10/2020 | Zhou | H01C 7/02 |

FOREIGN PATENT DOCUMENTS

| | | | | |
|---|---|---|---|---|
| JP | 2007005547 | | * | 1/2007 |
| TW | 202125540 | A | | 1/2021 |

* cited by examiner

OVER-CURRENT PROTECTION DEVICE

BACKGROUND OF THE INVENTION

(1) Field of the Invention

The present application relates to an over-current protection device, and more specifically, to an over-current protection device having low electrical resistivity and excellent voltage endurance capability.

(2) Description of the Related Art

Because the electrical resistance of conductive composite materials having a positive temperature coefficient (PTC) characteristic is very sensitive to temperature variation, it can be used as the material for current sensing devices and has been widely applied to over-current protection devices or circuit devices. More specifically, the electrical resistance of the PTC conductive composite material remains extremely low at normal temperatures, so that the circuit or cell can operate normally. However, when an over-current or an over-temperature event occurs in the circuit or cell, the electrical resistance will instantaneously increase to a high electrical resistance state (e.g., at least above $10^4\Omega$), which is the so-called "trip". Therefore, the over-current will be eliminated so as to protect the cell or the circuit device.

The basic structure of the over-current protection device consists of a PTC material layer and two electrodes bonded to two opposite sides of the PTC material layer. The PTC material includes a polymer matrix and a conductive filler uniformly dispersed in the polymer matrix. The polymer matrix of the over-current protection device may include a fluorine-free polyolefin-based polymer (e.g., polyethylene) as its major material. In the meanwhile, in order to have an over-current protection device having a low electrical resistance, the conductive filler may use conductive ceramic power. However, there will be various undesirable electrical characteristics exhibited if the PTC material layer is only composed of the conductive ceramic power and the fluorine-free polyolefin-based polymer. Accordingly, additional fillers are required. For example, magnesium hydroxide ($Mg(OH)_2$) is often added into the PTC material layer to function as flame retardant or thermally conductive filler. In other case, magnesium hydroxide ($Mg(OH)_2$) may be used as a filler for neutralization between acid and base, thereby solving the issue of hydrofluoric acid produced when mixing the conductive ceramic power with fluoropolymer under high temperature environment. However, neither the aforementioned functional fillers could impart excellent voltage endurance capability to the over-current protection device with low electrical resistivity.

Additionally, electronic apparatuses are being made smaller and smaller as time goes on. Therefore, it is required to extremely restrict the sizes or thicknesses of active and passive devices. However, if the top-view area of the PTC material layer is decreased, the electrical resistance of the device will be increased, and the voltage which the device can endure at most is lowered. Thus, the over-current protection device cannot withstand large current and high power. In addition, if the thickness of the PTC material layer is reduced, the voltage endurance capability of the device will be reduced at the same time. Apparently, small-sized over-current protection devices are easily burnt out in real applications.

Accordingly, there is a need to improve voltage endurance capability of small-sized over-current protection devices having low electrical resistivity.

SUMMARY OF THE INVENTION

The present invention provides an over-current protection device by introducing a compound with perovskite structure into a PTC composite. A fluorine-free polyolefin-based polymer in the PTC composite serves as the major material in the PTC composite, and the compound with perovskite structure serves as an inner filler in the PTC composite. According to the present invention, because the compound with perovskite structure is added into the PTC material layer (i.e., PTC composite), the over-current protection device not only exhibits low electrical resistivity but also has increased voltage endurance capability.

In accordance with an aspect of the present invention, an over-current protection device includes a first electrode layer, a second electrode layer, and a positive temperature coefficient (PTC) material layer laminated between the first electrode layer and the second electrode layer. The PTC material layer includes a polymer matrix, a conductive filler, and a titanium-containing inner filler. The polymer matrix includes a fluorine-free polyolefin-based polymer. The conductive filler is dispersed in the polymer matrix, thereby forming an electrically conductive path in the PTC material layer. The titanium-containing inner filler is dispersed in the polymer matrix, wherein the titanium-containing inner filler has a compound represented by a general formula (I): $MTiO_3$ (I). "M" represents transition metal or alkaline earth metal. The total volume of the PTC material layer is calculated as 100%, and the titanium-containing inner filler accounts for 1-9% by volume of the PTC material layer.

In an embodiment, the fluorine-free polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof.

In an embodiment, the titanium-containing inner filler is selected from the group consisting of $BaTiO_3$, $SrTiO_3$, $CaTiO_3$, and any combination thereof.

In an embodiment, $BaTiO_3$ accounts for 1-9% by volume of the PTC material layer.

In an embodiment, $SrTiO_3$ accounts for 1-3% by volume of the PTC material layer.

In an embodiment, $CaTiO_3$ accounts for 1-3% by volume of the PTC material layer.

In an embodiment, the titanium-containing inner filler has a median diameter ranging from 5 μm to 10 μm.

In an embodiment, the polymer matrix further includes a fluoropolymer.

In an embodiment, the total volume of the PTC material layer is calculated as 100%, and the fluorine-free polyolefin-based polymer accounts for 41-55% and the fluoropolymer accounts for 5-7% by volume of the PTC material layer.

In an embodiment, the fluoropolymer has a first dielectric constant and the titanium-containing inner filler has a second dielectric constant, and a value obtained by dividing the second dielectric constant by the first dielectric constant is in a range from 16 to 667.

In an embodiment, the fluoropolymer is selected from the group consisting of polyvinylidene fluoride, poly(tetrafluoroethylene), poly(vinylidene fluoride), ethylene-tetra-fluoro-ethylene, tetrafluoroethylene-hexafluoro-propylene copolymer, ethylene-tetrafluoroethylene copolymer, perfluoroalkoxy modified tetrafluoroethylenes, poly(chlorotrifluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

In an embodiment, the conductive filler comprises a conductive ceramic filler and carbon black, and the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

In an embodiment, the over-current protection device has an electrical resistivity ranging from 0.0217 Ω·cm to 0.0287 Ω·cm.

In an embodiment, the over-current protection device has a trip threshold value making the over-current protection device change from an electrically conductive state to an electrically non-conductive state, and the trip threshold value ranges from 0.198 $A/mm^2$ to 0.247 $A/mm^2$.

In an embodiment, the PTC material layer has a top-view area ranging from 25 $mm^2$ to 72 $mm^2$.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
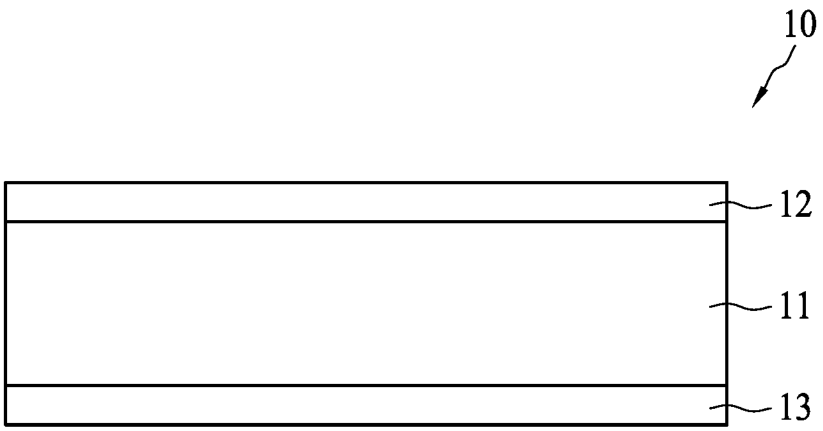
FIG. 1 shows an over-current protection device in accordance with an embodiment of the present invention.

FIG. 1 shows one basic aspect of an over-current protection device of the present invention. The over-current protection device 10 includes a first electrode layer 12, a second electrode layer 13, and a positive temperature coefficient (PTC) material layer 11 laminated between the first electrode layer 12 and the second electrode layer 13. In an embodiment, the first electrode layer 12 and the second electrode layer 13 may be composed of the nickel-plated copper foils. The PTC material layer 11 includes a polymer matrix, a conductive filler, and a titanium-containing inner filler.

In the PTC material layer 11, the polymer matrix has a fluorine-free polyolefin-based polymer, and the conductive filler is evenly dispersed in the polymer matrix, thereby forming an electrically conductive path in the PTC material layer 11. The so-called "polyolefin-based polymer" refers to a polymer polymerized from one or more compounds with alkene structure. In an embodiment, the fluorine-free polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof. In an embodiment, the conductive filler includes a conductive ceramic filler and carbon black. The conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

In addition to the above-said ingredients, according to the present invention, the titanium-containing inner filler is further added into the PTC material layer 11. The titanium-containing inner filler is well-mixed and dispersed in the polymer matrix evenly, thereby enhancing the voltage endurance capability of the over-current protection device 10. More specifically, the titanium-containing inner filler may include one or more materials with perovskite structure, in which the one or more compounds has a general formula represented by $MTiO_3$. The "M" in this general formula can be transition metal or alkaline earth metal. The transition metal may be manganese (Mn), and the alkaline earth metal may be beryllium (Be), magnesium (Mg), calcium (Ca), strontium (Sr), barium (Ba), or radium (Ra). For example, in case calcium (Ca), strontium (Sr), or barium (Ba) is selected as the alkaline earth metal, and thus, the titanium-containing inner filler could be selected from the group consisting of $BaTiO_3$, $SrTiO_3$, $CaTiO_3$, and any combination thereof. Having low thermal conductivity, this kind of inner filler (i.e., material with perovskite structure) is beneficial to the process of recrystallization of the fluorine-free polyolefin-based polymer from high temperature to low temperature. More specifically, the fluorine-free polyolefin-based polymer contains both crystalline and amorphous regions, and the molecules in the crystalline region are arranged in order and in the amorphous region are arranged in random orientation. In other words, the fluorine-free polyolefin-based polymer possesses a specific degree of crystallinity and non-crystallinity. During trip of the over-current protection device 10, the crystallinity of the fluorine-free polyolefin-based polymer decreases and electrical resistance thereof is elevated owing to the high temperature of trip. After that, the fluorine-free polyolefin-based polymer is recrystallized and the crystallinity is increased from the "tripped state" under high temperature to the "untripped state" under room temperature, so as to make the polymer ultimately come back to its initial state. However, if the temperature cooling rate during recrystallization process is too high, the fluorine-free polyolefin-based polymer would be recrystallized to preferably form smaller crystals rather than larger and intact crystals during the process from high temperature to room temperature. Having too much small crystals gives the fluorine-free polyolefin-based polymer the higher electrical resistance, that is, the worse capability for the electrical resistance recovery from high temperature to room temperature. If the situation of cooling at high rate repeats during operation of the over-current protection device 10, the device 10 cannot exhibit a desired "electrical resistance retention ratio" (see the definition below Table 2) and the stability of entire system is influenced which leads to failing of the device 10 in cycle life test. In short, the material with perovskite structure functions as the inner filler which makes the fluorine-free polyolefin-based polymer be cooled down at a suitable rate, and the fluorine-free polyolefin-based polymer can be recrystallized into larger and intact crystals during the process of recrystallization.

Moreover, the total volume of the PTC material layer is calculated as 100%, and the titanium-containing inner filler accounts for 1-9% by volume of the PTC material layer. The amount of the titanium-containing inner filler could not be too much or too less. If the volume percentage of the titanium-containing inner filler is less than 1%, the issue of negative coefficient temperature (NTC) behavior after trip of device would occur. The NTC behavior after trip of device refers to a situation in which a high electrical resistance (after trip of device) gradually decreases with gradual elevation of temperature. In other words, if the volume percentage of the titanium-containing inner filler is less than 1%, the over-current protection device 10 is similar to the device with no inner filler, both of which have similar voltage endurance capability. If the volume percentage of the titanium-containing inner filler is more than 9%, the wettability of the mixture of the fluorine-free polyolefin-based polymer and fillers is insufficient, therefore the fluorine-free polyolefin-based polymer, the titanium-containing inner filler, and/or the conductive filler are unable to be blended to form a uniformly mixed mixture. Besides, when the fluorine-free polyolefin-based polymer is blended with the titanium-containing inner filler, the titanium-containing inner filler is filled and can only be accommodated in the amorphous region. If the volume percentage of the titanium-containing inner filler is too high, the amount of the titanium-containing inner filler exceeds the limit the amorphous region can afford and part of the titanium-containing inner filler aggregates at the boundary of the amorphous region. Preferably, the titanium-containing inner filler accounts for 2%, 5%, 8%, 2% to 8%, or 5% to 8% by volume of the PTC material layer. Different perovskites are suitable for different formulations. For example, in an embodiment, the titanium-containing inner filler is $BaTiO_3$, and $BaTiO_3$ accounts for 1-9% by volume of the PTC material layer. In an embodiment, the titanium-containing inner filler is $SrTiO_3$, and $SrTiO_3$ accounts for 1-3% by volume of the PTC material layer. In an embodiment, the titanium-containing inner filler is $CaTiO_3$, and $CaTiO_3$ accounts for 1-3% by volume of the PTC material layer.

In the PTC material layer 11, the polymer matrix may further include a fluoropolymer. The fluorine-free polyolefin-based polymer is the major material of the polymer matrix, and the fluoropolymer is the minor material of the polymer matrix. For example, the total volume of the PTC material layer is calculated as 100%, and the fluorine-free polyolefin-based polymer accounts for 41-55% and the fluoropolymer accounts for 5-7% by volume of the PTC material layer. In an embodiment, the fluoropolymer is selected from the group consisting of polyvinylidene fluoride, poly(tetrafluoroethylene), poly(vinylidene fluoride), ethylene-tetra-fluoro-ethylene, tetrafluoroethylene-hexafluoro-propylene copolymer, ethylene-tetrafluoroethylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

It is noted that hydrofluoric acid is produced from degradation of the fluoropolymer under high temperature, and the titanium-containing inner filler may also function as an excellent dielectric filler to prevent the production of hydrofluoric acid. More specifically, the fluoropolymer has a first dielectric constant, and the titanium-containing inner filler has a second dielectric constant. A value obtained by dividing the second dielectric constant by the first dielectric constant is in a range from 16 to 667. Compared with the fluoropolymer, the filler with a higher dielectric constant may possess better capability for electric polarization. That is, the filler with a higher dielectric constant has a better capability to restrict movement of electric charges, and thus lowers tendency of negative charges to attack the fluoropolymer. In other words, as long as a specific amount of the titanium-containing dielectric filler is added into the polymer matrix, the added titanium-containing dielectric filler may help in trapping negative charges after trip of device and consequently lowering the energy accumulated at the fluoropolymer, thereby avoiding degradation of the fluoropolymer. In this way, the integrity of the composite system is well stabilized, and thus the over-current protection device can withstand more times of voltage of same value applied to the device. Besides, the less degradation of the fluoropolymer takes place, the less hydrofluoric acid is produced. This prevents environmental pollution, device corrosion, or other adverse factors that affect performance of the over-current protection device.

The dispersity of the titanium-containing inner filler in the polymer matrix and processability during blending operation should be taken into consideration, and therefore the titanium-containing inner filler has a median diameter ranging from 5 μm to 10 μm, wherein the median diameter is denoted by D(0.5). In the present invention, D(0.5)=5-10 μm means that on the premise that total number of filler particles is calculated as 1(100%), the number of the filler particles with particle diameter smaller than 5-10 μm is equal to or less than 0.5 (50%). As noted above, in consideration of processability for blending the polymer matrix with the titanium-containing inner filler particles, median diameter D(0.5) of the titanium-containing inner filler has to be appropriately controlled. If the median diameter D(0.5) is smaller than 5 μm, aggregation of small-sized filler particles would dominantly occur, and also, the small-sized filler particles having light weight before blending will easily suspend in the air. If the median diameter is larger than 10 μm, sedimentation of large-sized filler particles would dominantly occur, and hence the large-sized filler particles will deposit in certain regions of the PTC material layer after blending. In the latter case, the titanium-containing inner filler particles would stick together, causing agglomeration of these large-sized particles. Since, in the present invention, amount and particle size of the titanium-containing inner filler are properly adjusted, the over-current protection device 10 has an electrical resistivity ranging from 0.0217 Ω·cm to 0.0287 Ω·cm. Additionally, the device can pass a cycle life test undergoing 100 cycles while maintaining low electrical resistivity.

Figure 2:
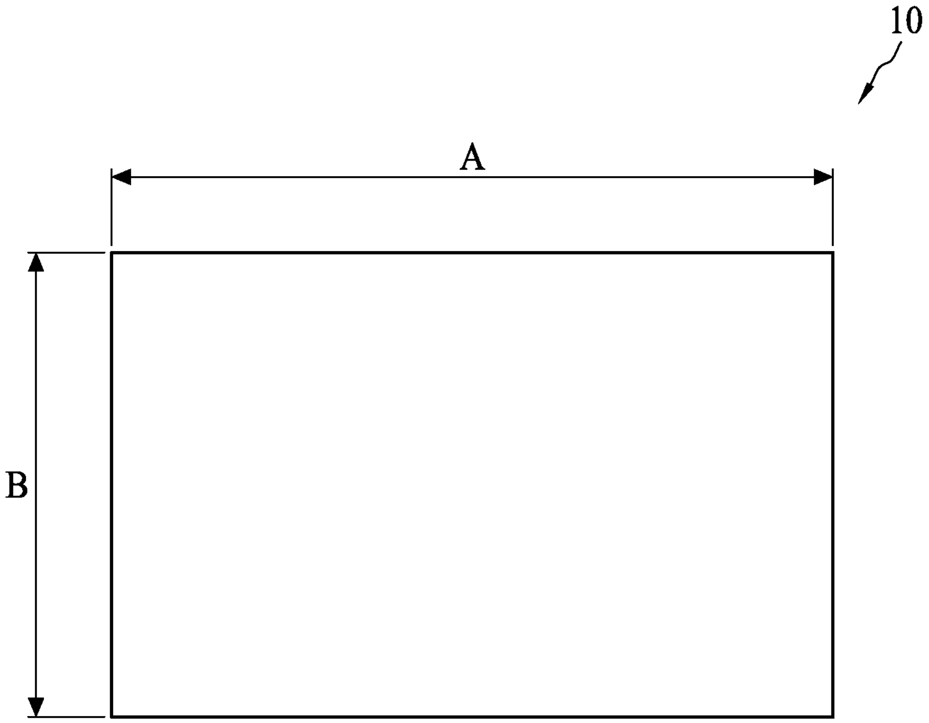
FIG. 2 shows the top view of the over-current protection device shown in FIG. 1.

Please refer to FIG. 2, which shows the top view of the over-current protection device 10 as shown in FIG. 1. The over-current protection device has a length A and a width B, and the top-view area "A×B" of the over-current protection device 10 is substantially equivalent to the top-view area of the PTC material layer 11. The PTC material layer 11 may have a top-view area ranging from 25 $mm^2$ to 72 $mm^2$ based on different products having different sizes. In some embodiments, the top-view area "A×B" may be 5×5 $mm^2$, 5.1×6.1 $mm^2$, 5×7 $mm^2$, 7.62×7.62 $mm^2$, 8.2×7.15 $mm^2$, or 7.62×9.35 $mm^2$.

It is noted that FIG. 1 merely and exemplarily shows one basic structure of the over-current protection device. In practice, various designs may be applied thereto. For instance, area of device exposed to the environment could be decreased, insulation of device from the environment could be enhanced, or external leads can be installed onto the device, etc. In an embodiment, a solder paste is coated on the outer surfaces of the first electrode layer 12 and second electrode layer 13, and two copper electrodes with a thickness of 0.5 mm are respectively welded on the solder paste on the first electrode layer 12 and second electrode layer 13 as external leads, and then the assembled device is subjected to a reflow soldering process at 300° C. so as to form a PTC device of an axial-type or a radial-leaded type. In other embodiments, printed circuit board (PCB) manufacturing processes may be adopted to form a PTC device of surface-mountable device (SMD) type, by which insulating layers are formed on the first electrode layer 12 and second electrode layer 13, respectively, and followed by forming external electrode layers on the insulating layers. Then, a patternization process is conducted on the external electrode layers so as to form external electrodes, and conductive connecting holes are made for electrical connection between the first electrode layer 12/second electrode layer 13 and the external electrodes. The PTC devices according to the present invention are not limited to the above mentioned types, such as axial-type, radial-leaded type, or SMD type. The above over-current protection device 10 is intended to be illustrative in the present disclosure only.

As described above, the over-current protection device 10 of the present invention has low electrical resistivity and excellent voltage endurance capability. It could be verified according to the experimental data in Table 1 to Table 3 as shown below.

6 vol %. In addition, each test group has approximately same volume percentage in polymer matrix (LDPE/HDPE and PVDF), and also in conductive filler (CB and WC). However, different inner filler materials (i.e., blank, $Mg(OH)_2$, $BaTiO_3$, $SrTiO_3$, and $CaTiO_3$) are used to compare experimental results of these test groups. The above-said "blank" means that the PTC material layer 11 includes only the conductive filler (e.g., CB and WC) as its filler, and no additional inner filler is added thereinto. For the polymer matrix used in the tests, HDPE is manufactured by Formosa Plastics Corporation and commercialized under the brand name Taisox HDPE-8010, LDPE is manufactured by Formosa Plastics Corporation and commercialized under the brand name Taisox 6330F, and PVDF is commercialized under the brand name Kynar® 761A and has a melting point temperature of 165° C. For the conductive filler, tungsten carbide (WC) has a relatively high volume percentage in the PTC material layer 11 in order to lower electrical resistance of the device, and carbon black (CB) is included therein with a relatively less amount in order to increase voltage endurance and electrical characteristic stability of the device. Besides, according to the present invention, the fluorine-free polyolefin-based polymer is not limited to LDPE or HDPE, and the conductive filler is not limited to tungsten carbide (WC) or carbon black (CB). According to the present invention, all the aforementioned fluorine-free polyolefin-based polymers and conductive fillers may be implemented in the tests and may produce similar technical effect, and thus details using these materials are not further described herein.

TABLE 1

| (volume percentage, vol %) | | | | | | | | | |
|---|---|---|---|---|---|---|---|---|---|
| Group | LDPE | HDPE | PVDF | $Mg(OH)_2$ | $BaTiO_3$ | $SrTiO_3$ | $CaTiO_3$ | CB | WC |
| E1 | | 48.0 | 6.0 | | 2.0 | | | 4.0 | 40.0 |
| E2 | | 45.0 | 6.0 | | 5.0 | | | 4.0 | 40.0 |
| E3 | | 42.0 | 6.0 | | 8.0 | | | 4.0 | 40.0 |
| E4 | | 48.0 | 6.0 | | | 2.0 | | 4.0 | 40.0 |
| E5 | | 48.0 | 6.0 | | | | 2.0 | 4.0 | 40.0 |
| E6 | | 54.0 | | | 2.0 | | | 4.0 | 40.0 |
| E7 | 54.0 | | | | 2.0 | | | 4.0 | 40.0 |
| C1 | | 45.0 | 6.0 | 5.0 | | | | 5.0 | 39.0 |
| C2 | | 48.0 | 6.0 | | | | | 5.0 | 41.0 |

Table 1 shows the composition to form the PTC material layer 11 by volume percentages in accordance with embodiments (E1-E7) of the present disclosure and comparative examples (C1-C2). The first column in Table 1 shows test groups E1-C2 from top to bottom. The first row in Table 1 shows various materials used for the PTC material layer 11 from left to right, that is, low-density polyethylene (LDPE), high-density polyethylene (HDPE), polyvinylidene difluoride (PVDF), magnesium hydroxide ($Mg(OH)_2$), barium titanate ($BaTiO_3$), strontium titanate ($SrTiO_3$), calcium titanate ($CaTiO_3$), carbon black (CB), and tungsten carbide (WC). It should be noted that the major material of the polymer matrix in either the embodiments (E1-E7) or comparative examples (C1-C2) is the fluorine-free polyolefin-based polymer, such as the polyethylenes listed in Table 1. More specifically, the PTC material of the groups to be tested is formulated based on "PE system" (i.e., a system adopts LDPE or HDPE as its major polymer material in the polymer matrix), and such system may also include minor amounts of PVDF to adjust properties of the polymer matrix. The volume percentage of LDPE or HDPE ranges from 42 vol % to 54 vol %, and the volume percentage of PVDF is In the embodiments E1-E7, at least one compound with perovskite structure (referred to as "perovskite-based compound" hereinafter) is included in the PTC material layer besides the polymer matrix and conductive filler. The perovskite-based compounds in the experiment are $BaTiO_3$, $SrTiO_3$, and $CaTiO_3$ with different volume percentages, respectively. In the embodiments E1 to E3, $BaTiO_3$ is selected with 2 vol %, 5 vol % and 8 vol % from low to high volume percentage. $SrTiO_3$ and $CaTiO_3$ in the embodiments E4 and E5 are selected with 2 vol %, so as to further demonstrate that the perovskite-based compounds can more effectively improve voltage endurance if the volume percentage is adjusted to 2 vol %. In the embodiments E6-E7, $BaTiO_3$ is selected with 2 vol %, and composition of the polymer matrix is changed to pure material (i.e., pure material consisting of LDPE or HDPE) for the experiment. It is noted that the volume percentage of perovskite-based compounds in the PTC material layer should not be too low or too high. If the volume percentage of the perovskite-based compound is below 2 vol %, the experimental result would be like that of "blank" where the PTC material layer 11 includes conductive filler (e.g., CB and WC) only. In other words, if the volume percentage of the perovskite-based compound in the PTC material layer 11 is lower than 2 vol %, the PTC material layer 11 would be like a PTC material layer with no inner fillers added thereinto, and the over-current protection device may have lots of undesirable electrical characteristics, such as NTC behavior after trip of device. If the volume percentage of the perovskite-based compound in the PTC material layer 11 is above 8 vol %, the issue of inconvenience in processability would be raised. That is, the wettability of the mixture (HDPE/LDPE and perovskite-based compound) is insufficient due to the excessive powder of perovskite-based compound, and hence the HDPE/LDPE and the perovskite-based compound, and/or the conductive filler are unable to be blended to form a uniformly mixed mixture. Moreover, when the fluorine-free polyolefin-based polymer (HDPE or LDPE) is blended with the titanium-containing inner filler ($BaTiO_3$, $SrTiO_3$, or $CaTiO_3$), the titanium-containing inner filler is filled in the amorphous region. If the volume percentage of the titanium-containing inner filler is too high, the amount of the titanium-containing inner filler exceeds the limit the amorphous region can afford and part of the titanium-containing inner filler aggregates at the boundary of the amorphous region. It is understood that proportions of the embodiments E1-E7 may be fine-tuned, all of which remain the same or similar technical effect as the original embodiments E1-E7.

In the comparative examples C1-C2, for comparison, $Mg(OH)_2$ and blank (i.e., no inner filler) are selected besides the polymer matrix and conductive filler. $Mg(OH)_2$ is a filler used in conventional over-current protection devices to function as flame retardant. Besides, $Mg(OH)_2$ may function as a filler for neutralization between acid and base. $Mg(OH)_2$ could react with hydrofluoric acid, which is produced from degradation of fluoropolymer, to generate magnesium fluoride ($MgF_2$) and water, thereby reducing hazards caused by hydrofluoric acid. In other words, $Mg(OH)_2$ can stabilize the aforementioned PE system, and is usually used in conventional over-current protection devices for extending device longevity.

The embodiments E1-E7 and comparative examples C1-C2 are all manufactured by the same method. First, materials of the test groups are formulated to the compositions with corresponding specific volume percentages (i.e., the percentages of embodiments and comparative examples as shown in Table 1), and the formulated materials are put into HAAKE twin screw blender for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm$^2$. The sheet is then cut into pieces of about 20 cm×20 cm, and two nickel-plated copper foils are laminated to two sides of the sheet with the hot press machine at a temperature of 210° C. and a pressure of 150 kg/cm$^2$, by which a three-layered structure is formed. Then, the sheet with the nickel-plated copper foils is punched into PTC chips, each of which is the over-current protection device of the present invention. The PTC chips to be tested has a length of 5.1 mm and a width of 6.1 mm, which means it has a top-view area of 31.11 mm$^2$, and additionally, it has a thickness of 0.65 mm. It is understood that the size of chip to be tested is intended to be illustrative only and is not limited in the present invention. The present invention may be applied to other PTC chips with different sizes, such as 5×5 mm$^2$, 5.1×6.1 mm$^2$, 5×7 mm$^2$, 7.62×7.62 mm$^2$, 8.2×7.15 mm$^2$, 7.62×9.35 mm$^2$, or any common size of the art.

Then, the PTC chips of the embodiments E1-E7 and comparative examples C1-C2 are subjected to electron beam irradiation of 50 kGy (irradiation dose can be adjusted depending on the requirement). After irradiation, the following measurements are performed by taking five PTC chips as samples for each of E1-E7 and C1-C2, by which voltage endurance of the PTC chips (i.e., the over-current protection device) can be verified. The results are shown in Table 2 below.

TABLE 2

| Group | $R_i$ (Ω) | ρ (Ω · cm) | I-trip (A) | I-trip/area (A/mm$^2$) | $R_{100c}$ (Ω) | Endurable power/area (W/mm$^2$) | $R_{100c}/R_i$ |
|---|---|---|---|---|---|---|---|
| E1 | 0.00494 | 0.0237 | 7.46 | 0.240 | 0.0074 | 11.51 | 1.5 |
| E2 | 0.00587 | 0.0281 | 6.81 | 0.219 | 0.0153 | 10.51 | 2.6 |
| E3 | 0.00600 | 0.0287 | 6.15 | 0.198 | 0.0234 | 9.49 | 3.9 |
| E4 | 0.00454 | 0.0217 | 7.69 | 0.247 | 0.0068 | 11.86 | 1.5 |
| E5 | 0.00460 | 0.0220 | 7.60 | 0.244 | 0.0069 | 11.73 | 1.5 |
| E6 | 0.00546 | 0.0261 | 7.01 | 0.225 | 0.0097 | 10.82 | 1.8 |
| E7 | 0.01028 | 0.0492 | 4.52 | 0.145 | 0.0174 | 6.97 | 1.7 |
| C1 | 0.00545 | 0.0261 | 6.52 | 0.210 | FAIL | NONE | NONE |
| C2 | 0.00415 | 0.0199 | 8.12 | 0.261 | FAIL | NONE | NONE |

In Table 2, the first row shows items to be tested from left to right.

"$R_i$" refers to initial electrical resistance of the over-current protection device at room temperature. In the embodiments E1-E7, $R_i$ ranges from 0.00454Ω to 0.01028Ω.

"ρ" refers to electrical resistivity of the over-current protection device at room temperature. It can be calculated in accordance with the electrical resistance formula $\rho=R\times A/L$. "R" is electrical resistance, "L" is length (thickness), and "A" is cross sectional area. In the embodiments E1-E7, ρ ranges from 0.0217 Ω·cm to 0.0492 Ω·cm.

"I-trip" refers to trip current needed for the over-current protection device at 25° C. In the embodiments E1-E7, I-trip ranges from 4.52 A to 7.69 A.

"I-trip/area" refers to trip current per unit area of the over-current protection device at 25° C. I-trip/area is also called as "trip threshold value," that is, a current value needed for trip of the over-current protection device per unit area. In the embodiments E1-E7, I-trip/area ranges from 0.145 A/mm$^2$ to 0.247 A/mm$^2$.

"$R_{100c}$" refers to electrical resistance of the over-current protection device after a cycle life test. The cycle life test is performed by 100 cycles of operation, each of which includes applying voltage/current at 48V/20 A for 10 seconds and turning it off for 60 seconds (i.e., on: 10 seconds; off: 60 seconds). Electrical resistance of the over-current protection device after 100 cycles is measured and therefore its $R_{100c}$ can be obtained. In the embodiments E1-E7, $R_{100c}$ ranges from 0.0068Ω to 0.0234Ω.

"Endurable power/area" refers to power per unit area that the over-current protection device can withstand without burnout. In the embodiments E1-E7, endurable power/area ranges from 6.97 W/mm$^2$ to 11.86 W/mm$^2$.

"$R_{100}/R_i$" refers to the ratio in which the electrical resistance of the over-current protection device after the cycle life test is divided by the initial electrical resistance of the over-current protection device at room temperature. In the present invention, this ratio is also defined as "electrical resistance retention ratio." The smaller the electrical resistance retention ratio is, the less fluctuation of the electrical resistance of the over-current protection device will be. That is, the over-current protection device with small electrical resistance retention ratio has better capability for electrical resistance recovery from trip of device toward the initial electrical resistance. In the embodiments E1-E7, $R_{100}/R_i$ ranges from 1.5 to 3.9.

From the above results, it is understood that the embodiments E1-E6 maintain low electrical resistivity while having capability to endure high voltage. More specifically, the embodiments E1-E6 have the electrical resistivity (ρ) ranging from 0.0217 Ω·cm to 0.0287 Ω·cm, the comparative examples C1-C2 have the electrical resistivity (ρ) ranging from 0.0199 Ω·cm to 0.261 Ω·cm, and there is little difference of the range of electrical resistivity (ρ) between the embodiments and examples. In this regard, it is known that the embodiments E1-E6 which are formulated to have perovskite-based compounds ranging from about 2 vol % to 8 vol % does not make the PTC chips have increased electrical resistivities but still possess excellent electrical conductivity at room temperature. As to the embodiment E7, the polymer matrix consists of LDPE which has more amorphous regions, and hence demonstrates higher electrical resistivity (ρ). However, the embodiment E7 can still pass the cycle life test and have an excellent electrical resistance retention ratio. In addition, it is clear that the embodiments E1-E7 of the present invention can endure 100 cycles without burnout when the applied voltage/current is set as 48V/20 A. However, for comparative examples C1-C2, $R_{100c}$ cannot be obtained because the devices are burnt out during the cycle life test. Apparently, perovskite-based compounds' intrinsic properties provide the device with excellent electrical performance in accordance with the specific volume percentages of the present invention.

More specifically, the perovskite-based compounds can be functional fillers in respect of PE system, and play a key role in recrystallization of polyethylene. The perovskite-based compounds having low thermal conductivity are beneficial to the process of recrystallization of polyethylene from high temperature to low temperature. More specifically, polyethylene contains both crystalline and amorphous regions, and the molecules in the crystalline region are arranged in order and in the amorphous region are arranged in random orientation. In other words, polyethylene possesses a specific degree of crystallinity and non-crystallinity. During trip of the over-current protection device 10, the crystallinity of the polyethylene decreases and electrical resistance thereof is elevated owing to the high temperature of trip. After that, polyethylene is recrystallized and the crystallinity is increased from the "tripped state" under high temperature to the "untripped state" under room temperature, so as to make the polymer ultimately come back to its initial state. However, if the temperature cooling rate during recrystallization process is too high, polyethylene would be recrystallized to preferably form smaller crystals rather than larger and intact crystals during the process from high temperature to room temperature. Having too much small crystals gives polyethylene the higher electrical resistance, that is, the worse capability for the electrical resistance recovery from high temperature to room temperature. If the situation of cooling at high rate repeats during operation of the over-current protection device 10, the device 10 cannot give a desired "electrical resistance retention ratio" and the stability of entire system is influenced which leads to failing of the device 10 in the cycle life test. To deal with that crystallization issue in PE system, the perovskite-based compounds are used to slow down the cooling rate of polyethylene, and therefore polyethylene can be crystallized to predominantly form the larger and intact crystals during the process of recrystallization. That is, the perovskite-based compounds may stabilize the entire PE system which enhances capability for recovery from trip of device toward the initial state, and the device longevity is extended.

It is noted that the fluoropolymer (i.e., PVDF), as the minor part of the polymer matrix, is also included in the present disclosure. Hydrofluoric acid is produced from degradation of the fluoropolymer under high temperature, and the perovskite-based compounds may also function as excellent dielectric fillers to prevent the production of hydrofluoric acid. For example, as for dielectric constant at room temperature, dielectric constant of PVDF ranges from about 6 to 10, $BaTiO_3$ ranges from about 2000 to 4000, $SrTiO_3$ ranges from about 200 to 250, and $CaTiO_3$ ranges from about 150 to 190. No matter what kind of perovskite-based compounds is used, perovskite-based compounds are high-dielectric materials compared to PVDF and therefore may have desirable characteristics in terms of capacitance. That is, perovskite-based compounds possess better capability for electric polarization when placed in an external electric field, thereby attracting free radicals or other charged matters away from PVDF. During the blending process or period of trip of device, the free radicals or other charged matters are generated from the PTC material layer 11, and these charged matters would attack PVDF and make it degraded thereafter. However, possibilities of degradation of PVDF can be lowered due to the capability for charge attraction possessed by the perovskite-based compounds, by which the integrity of the composite system is well stabilized. Compared with $Mg(OH)_2$ of the comparative example C1, the perovskite-based compounds of the present invention are used to prevent hydrofluoric acid from generation, instead of neutralizing hydrofluoric acid after its generation.

Please further refer to both Table 1 and Table 2. Table 2 shows that the PTC chip could have excellent electrical resistance retention ratio ($R_{100c}/R_i$) after appropriately formulating. The embodiments E1-E3 select $BaTiO_3$ as their inner fillers, and the volume percentage thereof are 2 vol %, 5 vol % to 8 vol %, respectively. It is found that as the volume percentage of $BaTiO_3$ is adjusted to 2 vol %, the PTC chip with the inner filler of $BaTiO_3$ has the lowest electrical resistance retention ratio of 1.5, which means it has the best capability for electrical resistance recovery. According to this result, the other two perovskite-based compounds with the same volume percentage (2 vol %), the embodiments E4 and E5, are also verified. In the embodiments E4 and E5, their electrical resistance retention ratios ($R_{100c}/R_i$) are the same, that is, 1.5. Although the embodiments E4 and E5 select different perovskite-based compounds, it can still maintain electrical resistance retention ratio approximate to that of the embodiment E1 if the volume percentage of the perovskite-based compound is adjusted to about 2 vol %.

On the basis of the data of embodiments E1, E4 and E5 given above, the present disclosure changes the composition of the polymer matrix to pure material and observes whether the perovskite-based compound (e.g., $BaTiO_3$) has the same technical effect under the same volume percentage. Accordingly, the polymer matrix only consists of HDPE in the embodiment E6, and the polymer matrix only consists of LDPE in the embodiment E7. As the results shown in Table 2, E6 and E7 pass the cycle life test, and both of them exhibit excellent electrical resistance retention ratio, that is, 1.8 and 1.7, respectively. It is suggested that the aforementioned stability of recrystallization, electric polarization, or other physical/chemical properties provided by $BaTiO_3$ may lead to the same technical effect under the same volume percentage thereof.

Particle size distribution of any perovskite-based compound of the present invention is under control and in a specific range. Before being formulated to the composition as shown in Table 1, particle size distribution of each perovskite-based compound is measured by the particle size analyzer (commercialized brand name Malvern Mastersizer 2000). The details are shown in Table 3 below.

TABLE 3

| perovskite-based compound | D(0.1) | D(0.5) | D(0.9) |
|---|---|---|---|
| $BaTiO_3$ | 0.970 μm | 8.290 μm | 19.300 μm |
| $SrTiO_3$ | 0.586 μm | 5.960 μm | 21.800 μm |
| $CaTiO_3$ | 0.950 μm | 9.150 μm | 27.300 μm |

As shown in Table 3, "D" stands for "Distribution of particle size", and the number within brackets after "D" refers to the proportion of the particles. Specifically, D(0.1), D(0.5), and D(0.9) represent particle sizes. The total number of particles is calculated as 1, so 0.1, 0.5 and 0.9 refer to 10%, 50% and 90%, respectively. For example, D(0.1) means that 10% of particles are smaller than the values of D(0.1) listed in Table 3. D(0.5) and D(0.9) are interpreted in the same way. Accordingly, D(0.5) stands for the middle value of particle size distribution, that is, the median diameter. In other words, in $BaTiO_3$, half the filler particles are smaller than 8.290 lam. In $SrTiO_3$, half the filler particles are smaller than 5.960 lam. In $CaTiO_3$, half the filler particles are smaller than 9.150 lam. In consideration of processability for blending the polymer matrix with the perovskite-based compounds and/or the conductive fillers, D(0.5) of the perovskite-based compound has to be appropriately controlled. If there are too many small filler particles, aggregation of the small-sized filler particles would dominantly occur. Also, the small-sized filler particles having light weight before blending will easily suspend in the air. If there are too many large-sized filler particles, sedimentation of the large-sized filler particles would dominantly occur, and hence the large-sized filler particles will deposit in certain regions of the PTC material layer after blending. In the latter case, the titanium-containing dielectric filler particles would stick together, causing agglomeration of these large-sized particles. In the present invention, D(0.5) of $BaTiO_3$, $SrTiO_3$, or $CaTiO_3$ is smaller than 10 lam, and such particle size is neither large nor small, and therefore it is beneficial to processability when blending with polymers and/or conductive fillers.

The above-described embodiments of the present invention are intended to be illustrative only. Numerous alternative embodiments may be devised by persons skilled in the art without departing from the scope of the following claims.

What is claimed is:

1. An over-current protection device, comprising:

a first electrode layer;

a second electrode layer; and a positive temperature coefficient (PTC) material layer laminated between the first electrode layer and the second electrode layer, the PTC material layer comprising:

a polymer matrix comprising a fluorine-free polyolefin-based polymer and a fluoropolymer, wherein the total volume of the PTC material layer is calculated as 100%, and the fluorine-free polyolefin-based polymer accounts for 41-55% and the fluoropolymer accounts for 5-7% by volume of the PTC material layer;

a conductive filler dispersed in the polymer matrix, thereby forming an electrically conductive path in the PTC material layer; and a titanium-containing inner filler dispersed in the polymer matrix, wherein the titanium-containing inner filler has a compound represented by a general formula (I):

$$MTiO_3 \quad (I)$$

wherein the M represents transition metal or alkaline earth metal, and the total volume of the PTC material layer is calculated as 100%, and the titanium-containing inner filler accounts for 1-9% by volume of the PTC material layer.

2. The over-current protection device of claim 1, wherein the fluorine-free polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof.

3. The over-current protection device of claim 2, wherein the titanium-containing inner filler is selected from the group consisting of $BaTiO_3$, $SrTiO_3$, $CaTiO_3$, and any combination thereof.

4. The over-current protection device of claim 3, wherein $BaTiO_3$ accounts for 1-9% by volume of the PTC material layer.

5. The over-current protection device of claim 3, wherein $SrTiO_3$ accounts for 1-3% by volume of the PTC material layer.

6. The over-current protection device of claim 3, wherein $CaTiO_3$ accounts for 1-3% by volume of the PTC material layer.

7. The over-current protection device of claim 3, wherein the titanium-containing inner filler has a median diameter ranging from 5 μm to 10 μm.

8. The over-current protection device of claim 3, wherein the conductive filler comprises a conductive ceramic filler and carbon black, and the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

9. The over-current protection device of claim 1, wherein the fluoropolymer has a first dielectric constant and the titanium-containing inner filler has a second dielectric constant, and a value obtained by dividing the second dielectric constant by the first dielectric constant is in a range from 16 to 667.

10. The over-current protection device of claim 9, wherein the fluoropolymer is selected from the group consisting of polyvinylidene fluoride, poly (tetrafluoroethylene), poly (vinylidene fluoride), ethylene-tetra-fluoro-ethylene, tetrafluoroethylene-hexafluoro-propylene copolymer, ethylene-tetrafluoroethylene copolymer, perfluoroalkoxy modified tetrafluoroethylenes, poly (chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

11. The over-current protection device of claim 10, wherein the conductive filler comprises a conductive ceramic filler and carbon black, and the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

12. The over-current protection device of claim 1, wherein the over-current protection device has an electrical resistivity ranging from 0.0217 Ω·cm to 0.0287 Ω·cm.

13. The over-current protection device of claim 12, wherein the over-current protection device has a trip threshold value making the over-current protection device change from an electrically conductive state to an electrically non-conductive state, and the trip threshold value ranges from 0.198 $A/mm^2$ to 0.247 $A/mm^2$.

14. The over-current protection device of claim 13, wherein the PTC material layer has a top-view area ranging from 25 $mm^2$ to 72 $mm^2$.

* * * * *